5 Sheets—Sheet 1.
W. H. DOANE & G. W. BUGBEE.
Universal Wood-Worker.
No. 210,761. Patented Dec. 10, 1878.
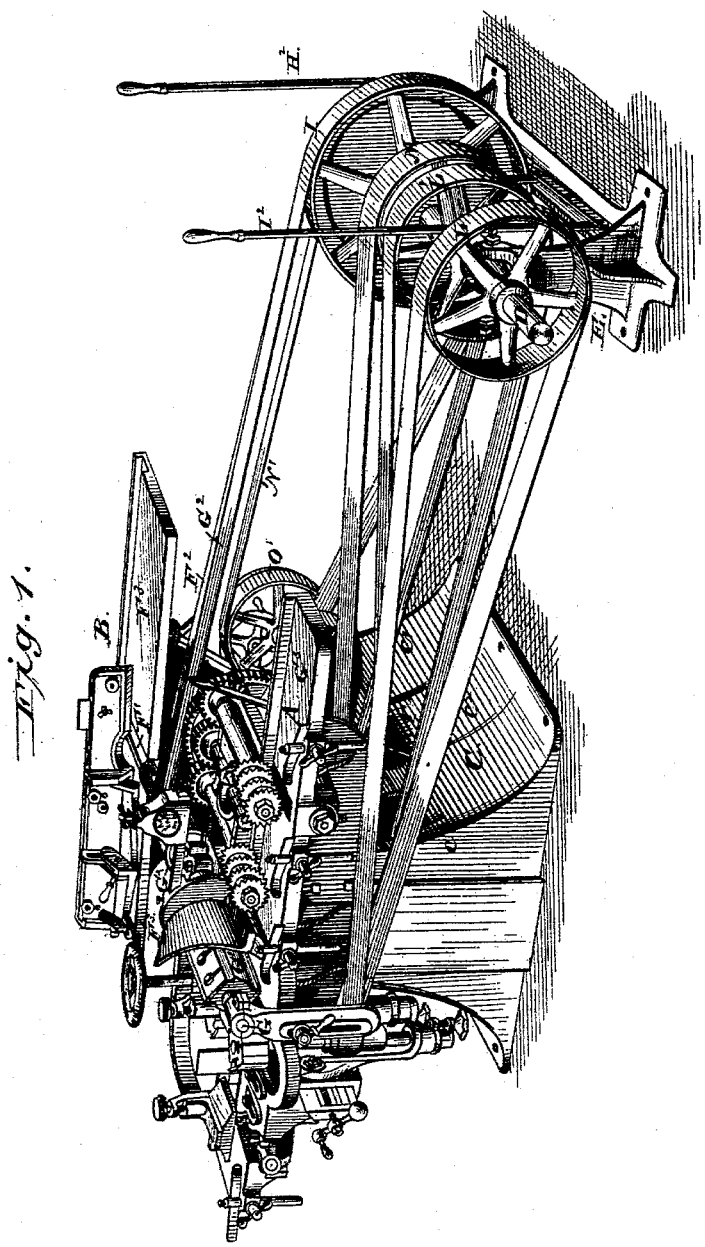

5 Sheets—Sheet 2.
W. H. DOANE & G. W. BUGBEE.
Universal Wood-Worker.
No. 210,761. Patented Dec. 10, 1878.
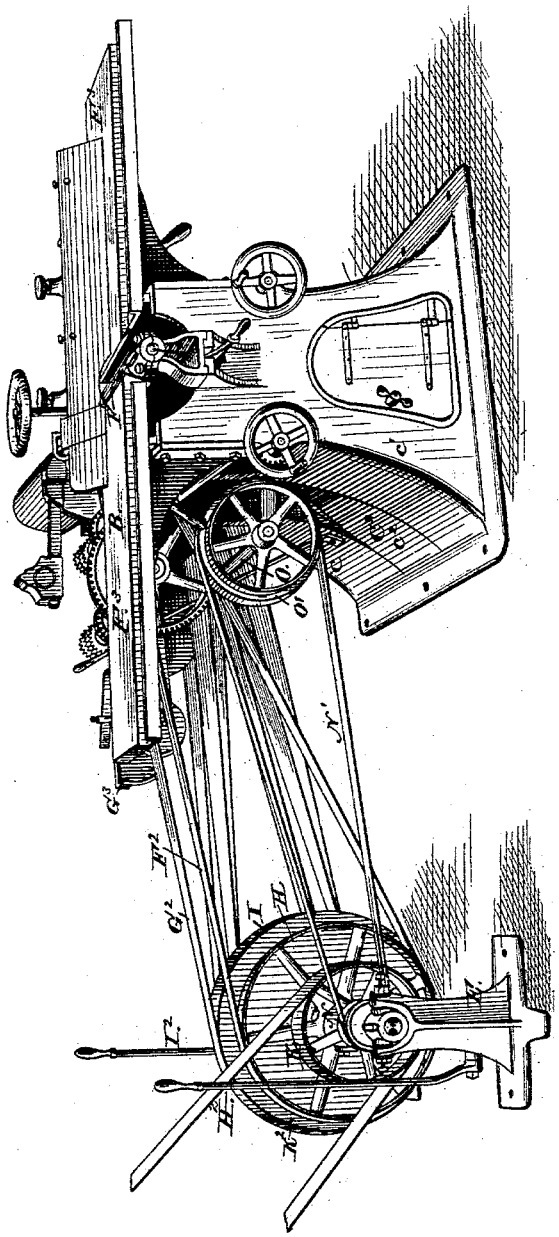

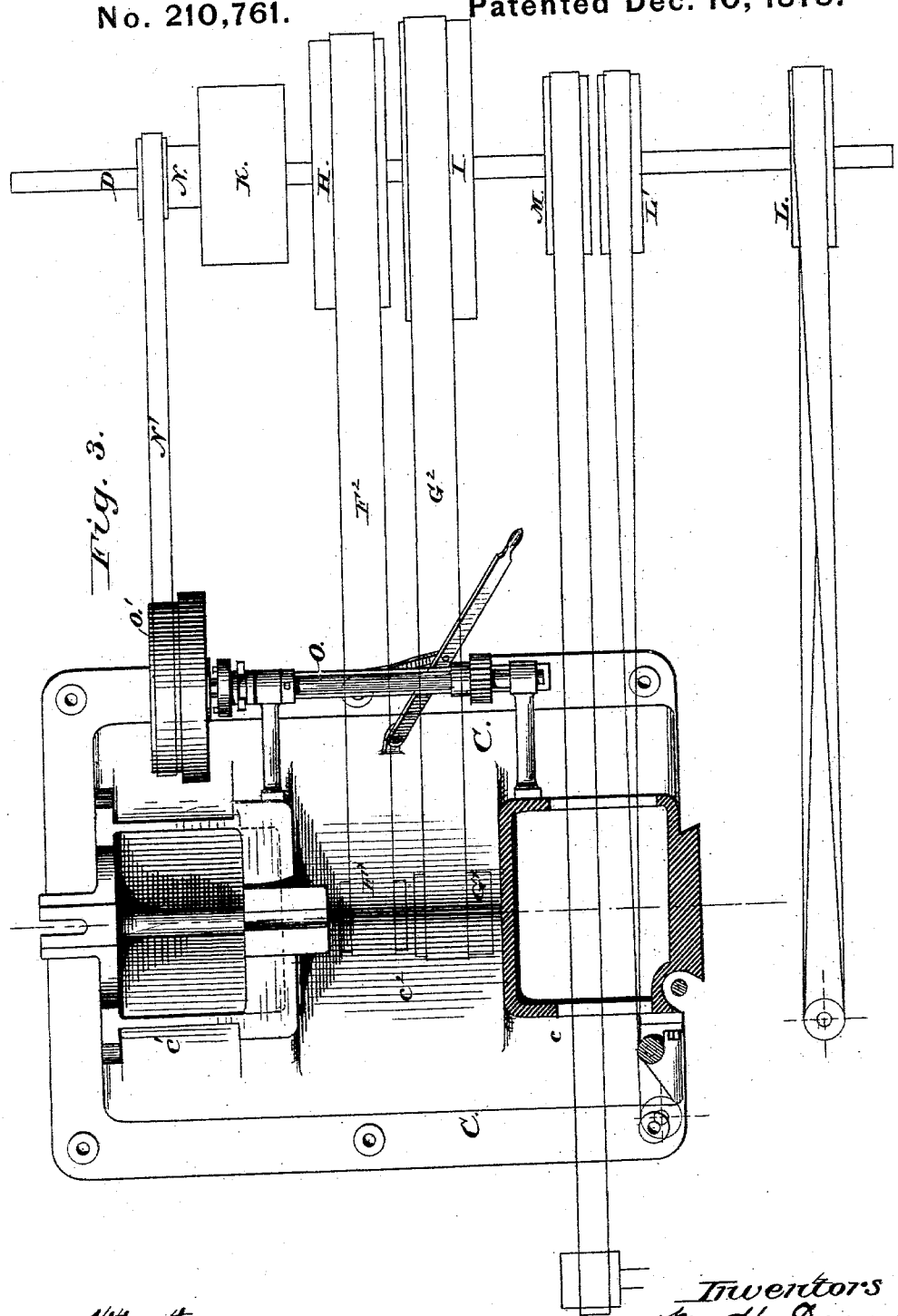

5 Sheets—Sheet 4.
W. H. DOANE & G. W. BUGBEE.
Universal Wood-Worker.
No. 210,761. Patented Dec. 10, 1878.
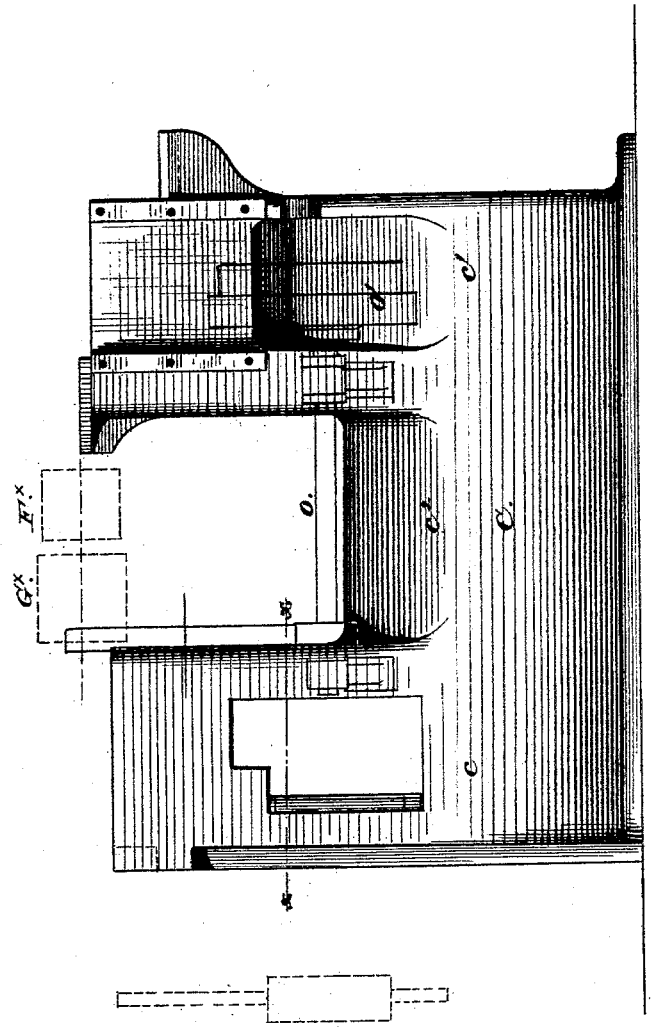

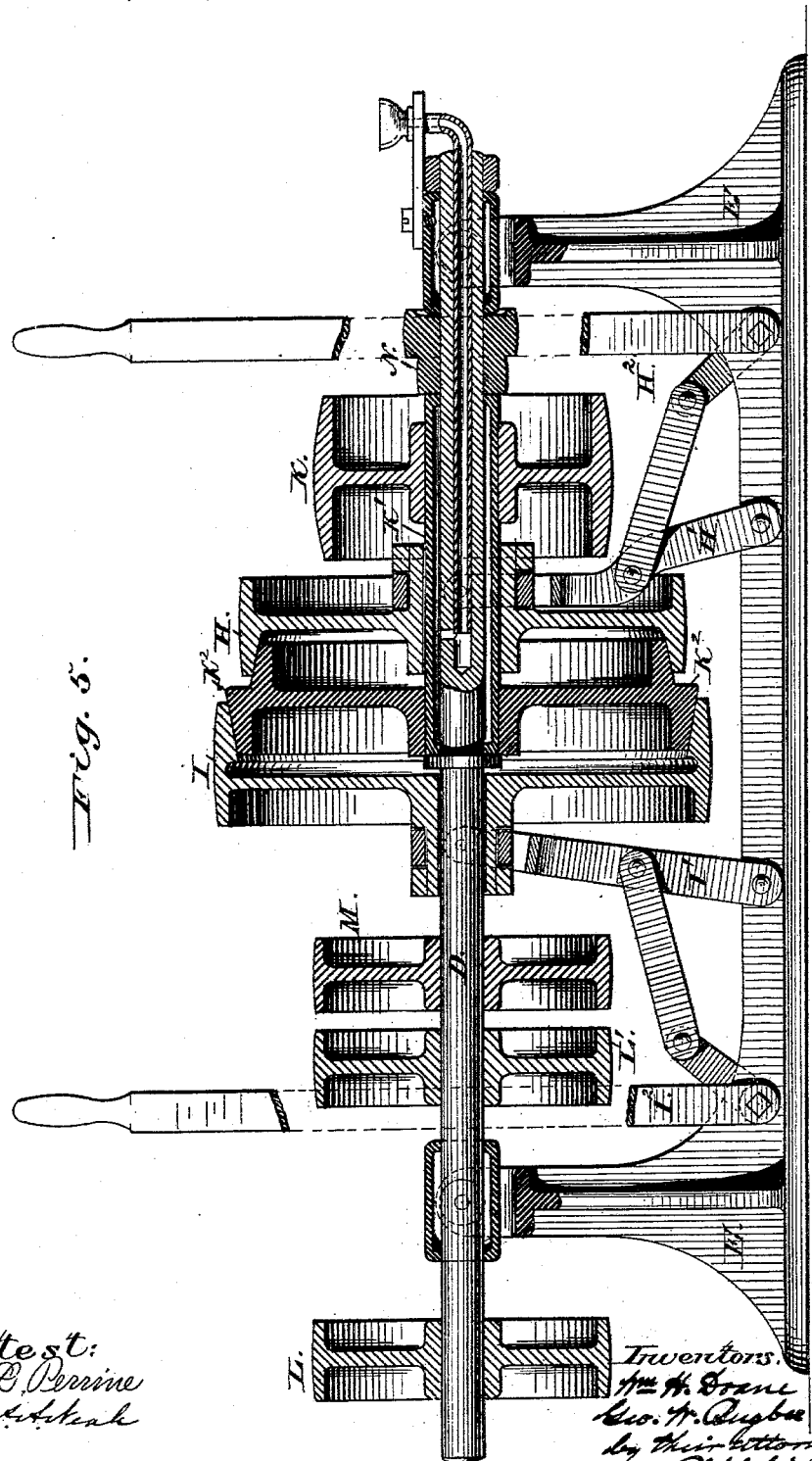

UNITED STATES PATENT OFFICE.

WILLIAM H. DOANE AND GEORGE W. BUGBEE, OF CINCINNATI, OHIO, ASSIGNORS TO J. A. FAY & CO., OF SAME PLACE.

IMPROVEMENT IN UNIVERSAL WOOD-WORKERS.

Specification forming part of Letters Patent No. 210,761, dated December 10, 1878; application filed August 31, 1878.

CASE A.

*To all whom it may concern:*

Be it known that we, WILLIAM H. DOANE and GEORGE W. BUGBEE, both of Cincinnati, in the county of Hamilton and State of Ohio, have invented certain new Improvements in Universal Wood-Workers, of which the following is a full, clear, and exact description.

This invention relates to that class of wood-working machines termed "universal wood-workers," by reason of the fact that a great diversity of work can be done with such a machine. Though its range of work equals the combined capacities of numerous ordinary wood-working machines, each adapted to perform a certain kind of work only, still our universal wood-worker actually combines only two machines in its construction. For the sake of clearness we will call one member of our combined machine the "hand wood-worker," and the other member the "molding-machine."

The features of novelty set forth specifically in the claims at the close of this specification relate to certain structural peculiarities and combinations of parts common to the two members of the machine, making a unit thereof, and will be clearly understood from the following description.

In the accompanying drawings, Figure 1 is a perspective view of our universal wood-worker as it appears from the molding-machine side. Fig. 2 is a perspective view of our universal wood-worker as it appears from the hand wood-worker side. Fig. 3 is a sectional plan view of the frame-work of our universal wood-worker, showing also in outlines the center shaft and its pulleys, together with the belts and the machine-pulleys driven thereby. Fig. 4 is an end view of the frame of our universal wood-worker. Fig. 5 is a vertical axial section of the counter-shaft, with its pulleys and other appendages.

The same letters of reference are used in all the figures in the designation of identical parts.

We deem it unnecessary to enter into any detailed description in this specification of any other features of our universal wood-worker but such as relate to the machine as a combined machine, because the other details of construction of the molding-machine and of the hand wood-worker are fully set forth in applications for Letters Patent concurrent with this application.

The mechanism of the molding-machine is generally designated by letter A, and the mechanism of the hand wood-worker by the letter B. These mechanisms are mounted upon the main frame C, which is a single piece of casting composed of the stands $c$ and $c^1$ and the connecting-base $c^2$. The mechanism of the hand wood-worker is arranged upon stand $c^1$, and the principal part of the mechanism of the molding-machine on stand $c$ on the main frame. The stuff is fed through the molding-machine by power, while on the hand wood-worker it is fed and manipulated by hand.

The different cutter-heads and the feed-rolls of the combined machine are driven by pulleys on a single counter-shaft, D, arranged across one end of the machine, and preferably supported upon a separate stand, E. In order that this may be done without interfering with the free movements of the operators in working the two members of the combined machine, and that the pulleys to be driven may be in the most advantageous positions to provide for the desired compactness, we arrange the hand wood-worker with its rear end to the counter-shaft, while the molding-machine is disposed with its front end to the counter-shaft. This arrangement also brings the two members of the machine back to back, affording ready access along their outer sides to all the principal working parts, and places the operators in positions facing each other, so that they can pass stuff to each other across the machine with ease and facility.

The arbor F of cutter-head $F^1$ of the hand wood-worker and the arbor G of the main upper cutter-head, $G^1$, of the molding-machine are separate arbors, preferably arranged in the same axial line across the machine. Their adjacent ends nearly meet over the gap between the stands $c$ and $c^1$ of the main frame, and are respectively provided with pulleys $F^\times$ and $G^\times$, driven by separate belts $F^2$ and $G^2$ from the pulleys H and I on the counter-shaft. Cutter-head $F^1$ of the hand wood-worker operates on the bottom side of the stuff through a gap from underneath the tables $F^3$ $F^3$, over which the stuff is fed by hand, while cutter-head $G^1$ of the molding-machine operates on the top surface of the stuff fed by power over the table $G^3$ under said cutter-head. A wide space is left between the table $G^3$ and other appendages of the molding-machine and the tables $F^3$ $F^3$ of the hand wood-worker, so that the pulleys $F^\times$ and $G^\times$ can be conveniently operated by straight belts from the counter-shaft through this space.

The pulleys H and I on the counter-shaft can be made to rotate separately or together, as will be presently explained in detail, so that the cutter-heads $F^1$ and $G^1$ may be started and stopped independently of each other, which is a great desideratum in this kind of machines, as it gives each operator full control of his own member of the machine.

Pulley K on the counter-shaft is driven from the line-shaft. It is keyed to a sleeve, $K^1$, which turns loosely on the counter-shaft and carries a fixed double friction-clutch, $K^2$, adapted to drive either one or both of the pulleys H and I. Pulley H is loose on sleeve $K^1$, and can be slid thereon by a slipper, $H^1$, operated by a hand-lever, $H^2$, through a connecting-link, to be engaged by or disengaged from clutch $K^2$, to start or stop the hand wood-worker. Pulley I is connected by feather and groove to the counter-shaft, and can be slid thereon by a slipper, $I^1$, operated by a hand-lever, $I^2$, through a connecting-link, in order to be engaged by or disengaged from the clutch $K^2$, to stop or start the molding-machine.

The pulleys L and L', for driving the side cutter-heads of the molding-machine, pulley M, for driving the under cutter-head thereof, and cone-pulley N, for driving its feed mechanism, are all keyed to the counter-shaft, so that they will all start together with pulley I.

The pulleys for driving the several cutter-heads of the molding-machine occupy so much of the limited space on that end of the counter-shaft, and the belt $G^2$ runs so close to the back of the molding-machine, that to maintain the compactness of the combined machine we use an intermediate shaft, O, placed below the belts $F^2$ and $G^2$, and reaching across from stand $c$ to stand $c^1$, for transmitting motion to the feed-rolls through a train of gear-wheels arranged outside of belt $G^2$. This intermediate shaft is supported in brackets secured, respectively, to the stands $c$ and $c^1$, and it is driven from cone-pulley N on the counter-shaft by a belt, N', running to cone-pulley O' on said intermediate shaft, in rear of stand $c^1$ of the hand wood-worker.

Thus the feed-rolls are driven from the side of the machine appropriated to the hand wood-worker by an arrangement of transmitters, which entirely clear the belts $F^2$ and $G^2$, and do not interfere in any way with the manipulation of the hand wood-worker.

We are aware that the mere arrangement of two machines side by side on common framework is neither new nor patentable. We do not claim such a thing.

What we claim as our invention, and desire to secure by Letters Patent, is—

1. A universal wood-worker, on one side of which a horizontal cutter-head operates on stuff fed over it by hand, while on the other side a horizontal cutter-head operates on stuff fed under it by power, such a machine having the respective tables for said two cutter-heads mounted side by side at a distance apart, so as to leave a free open space between, where a belt or belts may run from a counter-shaft to drive the said cutter-heads.

2. In a universal wood-worker, on one side of which a horizontal cutter-head operates on stuff fed over it by hand, while on the other side a horizontal cutter-head operates on stuff fed under it by power, the combination, substantially as specified, of the respective tables for said two cutter-heads mounted side by side at a distance apart, and the separate arbors of said two cutter-heads, which have pulleys on their ends overhanging the space between the tables.

3. In a universal wood-worker, on one side of which a horizontal cutter-head operates on stuff fed over it by hand, while on the other side a horizontal cutter-head operates on stuff fed under it by power, the combination, substantially as specified, of the respective tables for said two cutter-heads mounted side by side at a distance apart, the separate arbors of said two cutter-heads, which have pulleys on their ends overhanging the space between the tables, and independent driving-pulleys on a single counter-shaft adapted to drive the said cutter-heads either separately or together.

4. In a universal wood-worker, the combination, substantially as specified, of the hand wood-worker and the molding-machine, arranged on a single frame and pointing with their front ends in opposite directions, with a single counter-shaft arranged across the end of the machine behind the hand wood-worker.

5. In a universal wood-worker combining in its construction a molding-machine and a hand wood-worker, the combination, substantially as before set forth, of the counter-shaft, the pulleys thereon for separately driving through belts the two axially-arranged independent cutter-heads, and the intermediate shaft below the path of said belts for driving the feed-gear of the molding-machine from the hand wood-worker side of the combined machine.

6. In a universal wood-worker, the combination, substantially as specified, of the counter-shaft, the loose driving-sleeve thereon, the duplex friction-clutch, a loose pulley on the driving-sleeve adapted to be driven by one face of the friction-clutch, and a fast but shiftable pulley on the counter-shaft adapted to be driven by the other face of the friction-clutch.

7. The main frame of a universal wood-worker composed, substantially as specified, of a single casting formed with two stands and a low connecting-web to leave a gap between the stands, on each of which a table or tables and cutter-heads are mounted for planing purposes.

In testimony whereof we have signed our names to the foregoing specification in the presence of two subscribing witnesses.

WM. H. DOANE.
GEORGE W. BUGBEE.

Witnesses:
  ALBERT N. SPENCER,
  CHAS. G. JONES.